United States Patent [19]
Erbert

[11] 3,777,264
[45] Dec. 4, 1973

[54] METER MOVEMENTS
[75] Inventor: Virgil Erbert, Albuquerque, N. Mex.
[73] Assignee: Rolamite Incorporated, San Francisco, Calif.
[22] Filed: Jan. 17, 1972
[21] Appl. No.: 218,388

Related U.S. Application Data
[63] Continuation-in-part of Ser. No. 114,312, Feb. 10, 1971, abandoned.

[52] U.S. Cl. .................................. 324/146, 324/155
[51] Int. Cl. .......................... G01r 1/00, G01r 11/02
[58] Field of Search ..................... 324/146, 147, 155

[56] References Cited
UNITED STATES PATENTS
2,498,261  2/1950  Fritzinger............................ 324/146
1,456,517  5/1923  Roller................................. 324/146

FOREIGN PATENTS OR APPLICATIONS
325,506  2/1930  Great Britain...................... 324/147

*Primary Examiner*—Alfred E. Smith
*Attorney*—Robert S. Swecker

[57] ABSTRACT

A moving magnet meter movement in which a pointer is mounted on a support member for pivoting about an axis. The pointer and the support member are formed of substantially flat sheet material interconnected by opposing surfaces adjacent the pivot axis for confining the pointer to swinging about said pivot axis with a minimum of frictional drag. A vane on the pointer is magnetized and an electromagnetic coil is positioned adjacent the vane to cause the pointer to swing about the pivot axis in response to the magnetic field associated with the coil.

17 Claims, 17 Drawing Figures

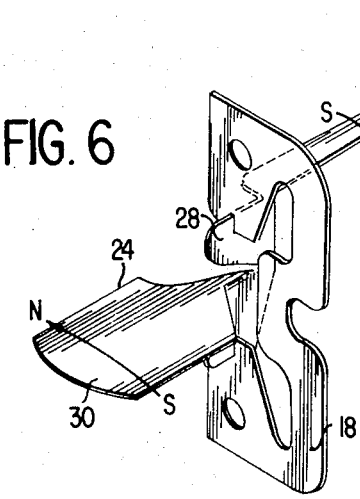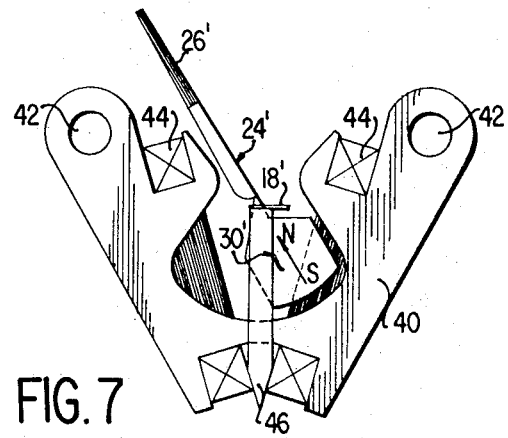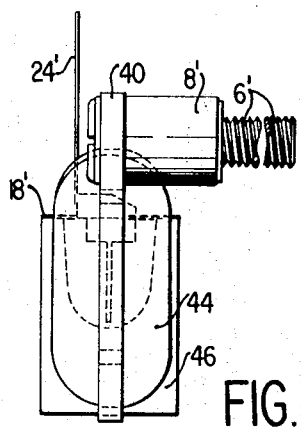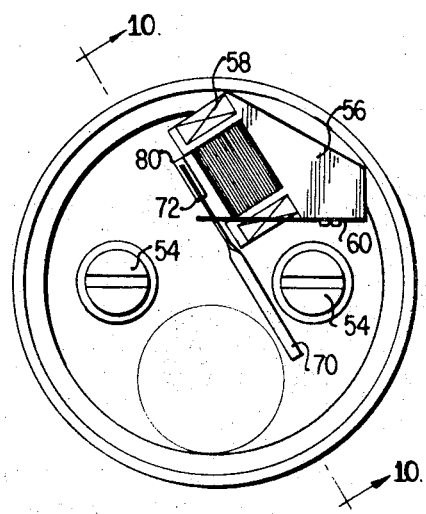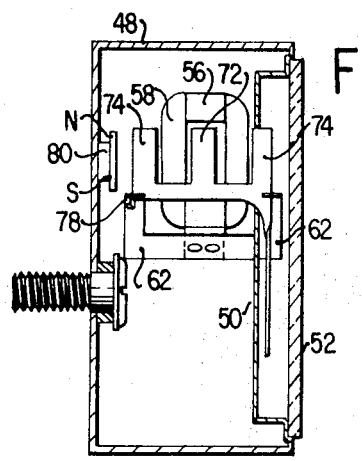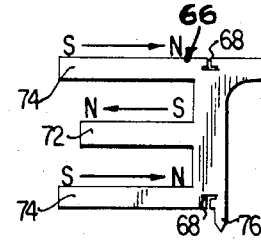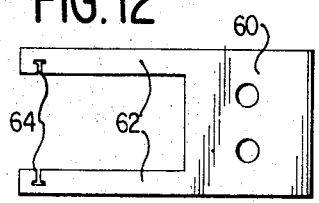

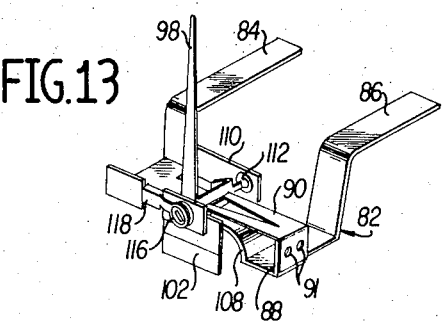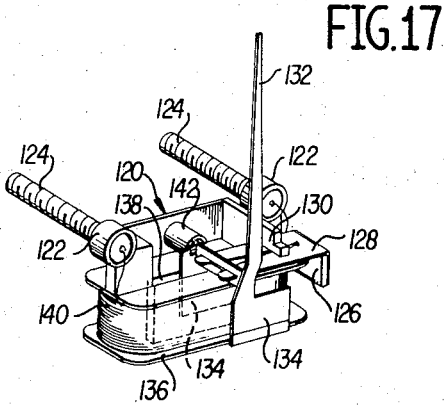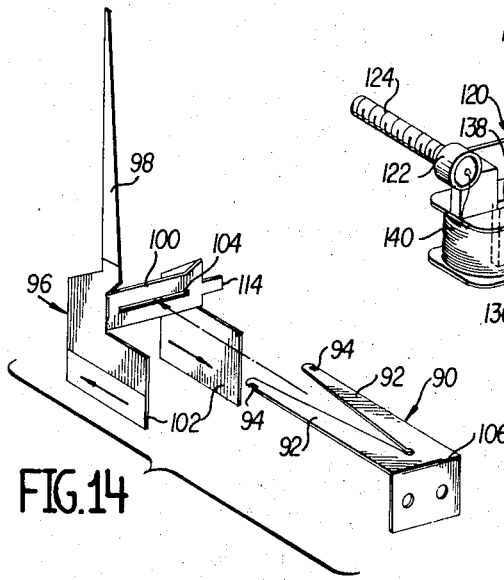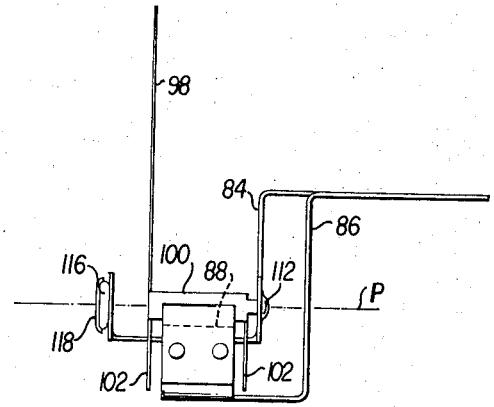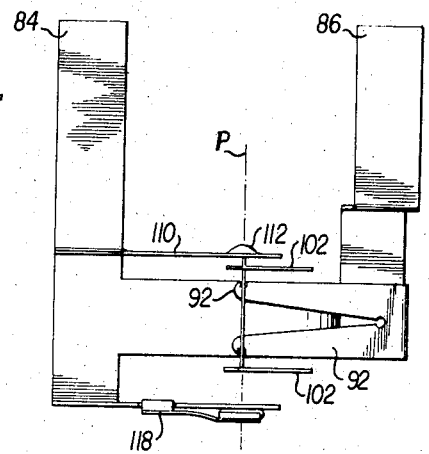

3,777,264

METER MOVEMENTS

CROSS REFERENCE TO RELATED APPLICATION

This application is a continuation-in-part of my earlier copending patent application entitled Meter Movements, Ser. No. 114,312, filed Feb. 10, 1971 now abandoned.

BACKGROUND OF THE INVENTION

This invention relates to electrical meters, and more particularly to meter movements of the moving magnet type.

There are two general classes of electrical meter movements that are in common use. One class is moving coil meters, in which a coil is mounted on a shaft between the poles of a fixed permanent magnet. The other class of meters is the moving magnet meters, in which the electric coil is fixed and the permanent magnet is mounted on a shaft for rotation relative to the coil. This invention relates to electrical meters of the moving magnet class. Conventional moving magnet meters typically include a shaft supported between jewel bearings. A permanent magnet washer is pressed on the shaft and is magnetized diametrically to cause the shaft to rotate about its central axis in response to magnetic flux in a direction that is angularly offset from the direction of magnetization of the washer. A pointer is also secured on the shaft to indicate the rotational position of the shaft. A restoring force urging the pointer to return to the zero position on the meter scale is usually provided by a bar magnet that is fixed on the meter frame. An electric coil is mounted on the meter frame adjacent the magnetic washer to provide a magnetic field of variable strength in proportion to the magnitude of the current flowing in the coil.

Another construction that is commonly used for moving magnet meters includes a fixed post that projects upwardly from the base of the meter. The end of the post is pointed and a stamped cap is mounted on the pointed end. Usually, the center of the cap rests on the pointed end, thereby allowing the cap to rotate about the post with a minimum of frictional resistance. A washer is magnetized diametrically and applied over the cap. A pointer is also pressed over the cap, and both the washer and the pointer turn with the cap as the cap rotates about the post. A restoring bar magnet is mounted on the base to cause the pointer to return to a predetermined position on the meter scale. An electric coil is mounted on the frame adjacent the cap, so that the magnetic flux produced by current in the coil causes the pointer to move in proportion to the magnitude of the current in the coil.

Both of these conventional moving magnet meters include three components which must be assembled together: (1) the magnetized washer, (2) the pointer, and (3) the pivotal support. The assembly of these components is usually accomplished by hand. These parts are very small and are difficult to handle. The worker must properly orient and position the washer and pointer relative to the cap while they are being pressed together. This is a relatively slow operation.

Another disadvantage of these conventional moving magnet meters is that the moving parts are relatively heavy, weighing of the order of 200 to 700 milligrams. When subjected to shock and vibration, the large mass of the moving components imposes significant impact on the bearings, thereby causing excessive wear. This problem of excessive wear cannot be overcome by increasing the size of the bearing surfaces, because there would be a corresponding increase in the frictional drag during rotation of the pointer. To compensate for the additional drag, a larger driving force would be required, which suggests that the moving magnet must have a larger mass, yet an increase in the mass of the magnet increases the load on the bearings. Therefore, this is not a practical solution to the problem of resisting shock and vibration.

SUMMARY OF THE INVENTION

In view of the defects of prior meter movements, it is an object of this invention to provide an improved electrical meter movement.

Another object of this invention is to provide an improved meter movement having a greater resistance to damage by shock and vibration.

A further object of this invention is to provide an electric meter movement which may be manufactured more efficiently, with fewer hand assembly operations.

Another object of this invention is to provide an electrical meter movement which occupies a minimum of space and which has more uniform characteristics.

These objects are accomplished in accordance with a preferred embodiment of the invention by an electrical meter movement that includes a base member having a pair of opposed edges, and a pointer member having corresponding opposed edges. The base member and the pointer member are assembled together so that the edges restrain relative movement of the members along each of the orthogonal axes, but permit the pointer to swing about a pivot axis defined by the opposed pairs of edges. The pointer member includes a vane which is magnetized along a selected direction. A fixed electromagnetic coil is positioned adjacent the vane and the magnet flux of the coil cooperates with the magnetized vane to apply torque to rotate the pointer about the pivot axis.

In a modified form of the preferred embodiment, a pair of coils are arranged to cooperate with the magnetized vane.

In accordance with another preferred embodiment of the invention, a pointer member is pivotally mounted on a base member and there are a plurality of vanes on the pointer member. A fixed electromagnetic coil is positioned adjacent the pivot axis. One of the vanes moves into and out of the center of the coil, while at least one other vane extends on the exterior of the coil. Both vanes are magnetized and are movable with the pointer about the pivot axis.

In accordance with still another preferred embodiment of the invention, a pair of vanes and a pointer and the pivot arrangement are formed integrally. The vanes are magnetized and a conductor on the frame passes between the vanes and is shaped to provide a linear scale displacement in response to current flowing in the conductor.

DESCRIPTION OF THE DRAWINGS

These preferred embodiments are illustrated in the accompanying drawings in which:

FIG. 6 is a perspective view of the pointer member and base member as assembled together;

FIG. 7 is a top plan view of a modified form of the meter movement according to FIGS. 1 to 6;

FIG. 8 is a side elevational view of the meter movement of FIG. 7;

FIG. 9 is a top plan view of a second preferred embodiment of the meter movement in accordance with this invention;

FIG. 10 is a cross-sectional view of the meter movement along the line 10—10 in FIG. 9;

FIG. 11 is a plan view of the pointer member;

FIG. 12 is a plan view of the base member;

FIG. 13 is a perspective view of a third preferred embodiment of the meter movement in accordance with this invention;

FIG. 14 is an exploded, detail view of the pointer and support members of the meter movement of FIG. 13;

FIG. 15 is a side elevational view of the meter movement of FIG. 13;

FIG. 16 is a front elevational view of the meter movement of FIG. 13; and

FIG. 17 is a perspective view of a fourth preferred embodiment of the meter movement.

DESCRIPTION OF THE PREFERRED EMBODIMENTS

Figure 1:
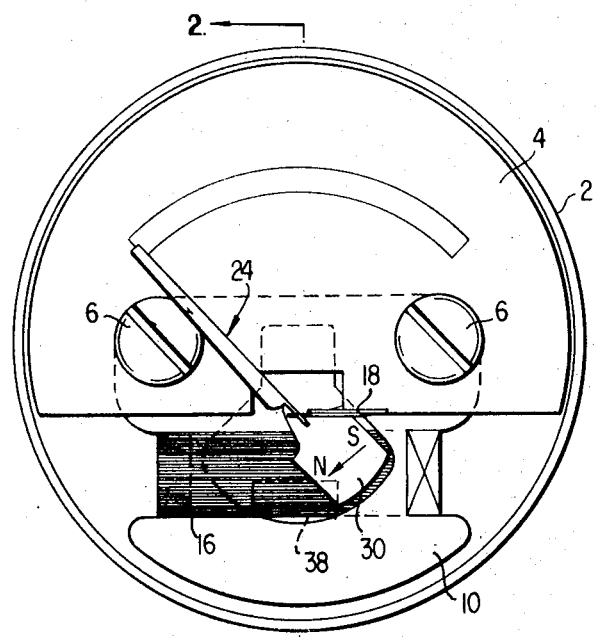
FIG. 1 is a top plan view of an electrical meter incorporating one preferred embodiment of the meter movement of this invention.

Referring to FIGS. 1 to 6, the meter movement in accordance with this invention is illustrated as mounted within a case 2 having a transparent cover 4. A pair of terminal posts 6 are secured on the case 2, and are insulated from the case by a bushing 8. A coil form 10 is rigidly mounted on the bushing 8. A dial plate 12 is also supported on the bushing 8.

Figure 2:
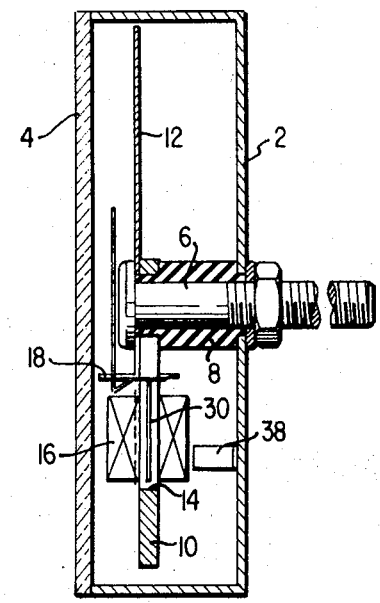
FIG. 2 is a cross-sectional view of the meter along the line 2—2 of FIG. 1.
Figure 3:
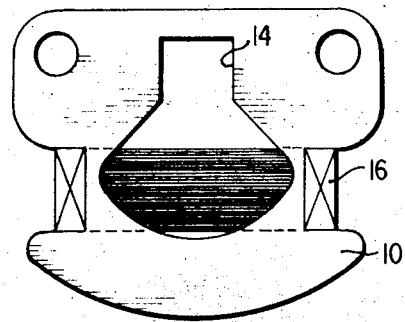
FIG. 3 is a detail view of the coil form.
Figure 4:
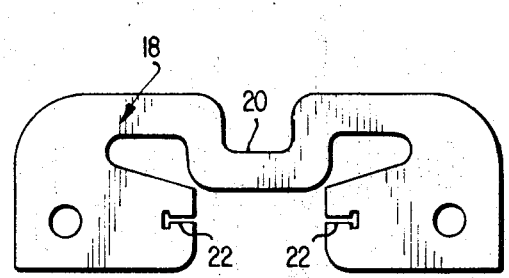
FIG. 4 is a top plan view of the base member.

As shown in FIGS. 2 and 3, the coil from 10 has a central opening 14 and a coil 16 is wrapped on the form. The sides of the coil 16 extend across the opening 14. A stationary pivot element 18 is supported on tabs projecting in opposite directions from the dial plate 12. The stationary pivot element is shown in elevation in FIG. 4, and includes a recess 20 which is aligned with the coil form 10 at the side of the opening 14. The stationary pivot element 18 is substantially flat and formed of thin, flexibly resilent sheet material, and is provided with a pair of opposed slots 22.

Figure 5:
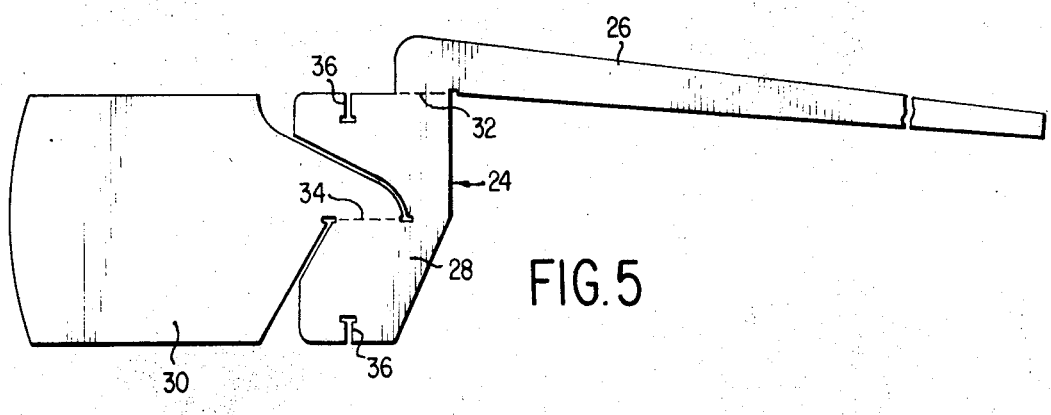
FIG. 5 is a top plan view of the flat blank from which the pointer member is formed.

A pointer element 24 is pivotally mounted on the stationary pivot member 18, as shown in FIG. 6. The pointer element 24 is shown in FIG. 5 prior to bending into the shape shown in FIG. 6. The pointer element is formed of thin, substantially flat, resiliently flexible material, and includes a pointer 26, a body 28 and a vane 30. The pointer 26 is folded along a bend line 32, so that it extends substantially perpendicular to the plane of the body 28. The vane 30 is folded along the bend line 34 so that it extends perpendicular to the body 28 and parallel to the pointer 26. The body 28 is provided with a pair of opposed slots 36 at its upper and lower edges. The spacing between the closed end of the slots 36 is substantially equal to the spacing between the closed ends of the slots 22.

When the stationary member 18 and the pointer element 24 are assembled, as shown in FIG. 6, the sides of the slots 36 extend on opposite sides of the stationary member 18, and the sides of the slots 22 extend along opposite sides of the body 28. The closed ends of the respective slots 22 and 36 are in engagement with each other to prevent movement of the body 28 relative to the stationary member 18. This arrangement provides a pivotal mounting for the pointer element 24 that has substantially no frictional resistance to movement, yet is restrained against displacement out of alignment with the pivot axis, as defined by the slots 22 and 36. This arrangement is described more fully in my copending application entitled Pivotal Mounting, Ser. No. 44,743, filed June 9, 1970 now U.S. Pat. No. 3,618,562.

The vane 30 is magnetized transversely, as indicated by the arrow in FIG. 6. The coil 16 is axially aligned with the pivot axis of the pointer element 24. The leads from the coil 16 are connected to the respective terminal posts 6 and when current is applied across the terminals, the flux produced by the coil produces a resultant force on the vane 30, causing the pointer 26 to swing clockwise as viewed in FIG. 1.

When the coil 16 is not energized, it is necessary to provide some means to return the pointer to a zero scale position. In the embodiment of FIGS. 1 to 6, this is accomplished by a restoring magnet 38 which is pivotally mounted in the bottom of the case 2. The restoring magnet 38 which is in the form of a bar magnet may be rotated and fixed, selectively to cause the pointer 26 to remain at a lefthand scale position, as in FIG. 1, when there is no current flowing in the coil 16, or the magnet 38 may be positioned to cause the pointer to return to a mid scale, or righthand scale position, if desired.

In order to render the pointer element 24 insensitive to external magnetic fields, the pointer 26 is magnetized in the opposite direction from that of the vane 30. The direction of magnetization is shown by the arrow on the pointer 26 in FIG. 6. The volume of material magnetized in one direction substantially equals the volume of material magnetized in the opposition direction.

When a source of current is connected across the terminals 6, the magnetic flux induced in the coil 16 is proportional to the current. The flux in the center of the coil is aligned with the axis of the coil. The vane 30 tends to swing about the pivot axis in a direction tending to increase the alignment of the direction of magnetization in the vane with the direction of flux in the center of the coil. This produces a torque on the pointer element causing the pointer 26 to swing clockwise across the scale, as viewed in FIG. 1.

The meter shown in FIGS. 1 to 6 may be modified for use as a high current ammeter. The modification consists of replacing the coil from 10 and the coil 16 with a brass strap which extends around the vane 30 in generally the same manner as the coil form 10. The ends of the strap are mounted in contact with the terminals 6 so that current flows through the strap. The flow of current induces magnetic flux around the strap causing the pointer 26 to swing about the pivot axis to a position that is proportional to the current flowing in the strap.

The meter assembly of FIGS. 1 to 6 has several significant advantages over conventional meters. The flat coil arrangement and the use of a vane which moves through the center of the coil provides a meter that can be mounted in a shallow case. The coil can be made smaller than conventional coils since the gap in the center of the coil is very narrow and the thin metal vane is freely movable in the gap without engaging the coil. This coil design also provide higher magnetic flux density than in conventional coils having large center gaps.

The structure of the pointer element and the stationary member requires a minimum of material and may be constructed and assembled inexpensively. Since the pointer element is formed of thin, light weight material, it is substantially insensitive to vibration and shock. The coil form 10 may be punched from fiberboard, or other inexpensive insulating material. Thus, the meter of FIGS. 2 to 6 is inexpensive to produce, and yet provides high sensitivity, with extremely good vibration and shock resistance.

A modified form of the embodiment of FIGS. 1 to 6 is illustrated in FIGS. 7 and 8. The case has been omitted to simplify the illustration. A coil form 40 is formed of insulating material, such as fiberboard, and has spaced holes 42 for mounting the coil form on the terminal posts 6' in the case. The bushing 8' serves as a spacer for the coil form.

A pair of wire coils 44 are wound on the coil form and a bracket member 46 is supported on the coil form 40. The bracket member 46 may be molded of plastic insulating material.

The bracket member is generally U-shaped, as shown in FIG. 8, and a support member 18' is secured across the end of the member 46. The support member 18' has substantially the same shape as the member 18, illustrated in FIG. 4. A pointer element 24', corresponding to the pointer element 24 in FIGS. 1 to 6, is pivotally mounted on the support member 18'. The vane 30' is magnetized longitudinally, as shown by the arrows in FIG. 7.

The coils 44 are wound in parallel so that the flux induced in the central gap of the coils is in the same general direction, although angularly offset. The vane 30 extends into the gap of the righthand coil 44 when the pointer 26' is at one end of the scale. Accordingly, the effect of the other coil on the vane is minimal. When the pointer 26' is at the opposite end of the scale, the vane 30 is positioned within the gap of the lefthand coil and the righthand coil has a minimal effect on the position of the pointer. The use of two coils 44, instead of a single coil, as in the meter of FIG. 10, provides improved linearity. The operation of the modified form of the meter movement illustrated in FIGS. 7 and 8 is substantially the same as that of the meter of FIGS. 1 to 6.

A second embodiment of the meter movement of this invention is illustrated in FIGS. 9 to 12. The meter movement is mounted in a case 48 having a dial plate 50 and a cover glass 52. A pair of terminals 54 extends through the back of the case 48. A coil form 56 is secured in the case 48 and a wire coil 58 is wound on the form 56. A support member 60, which is formed of substantially flat, thin, resiliently flexible material, is secured on the coil form.

The support member 60 has a pair of arms 62 which project across the coil 58, as shown in FIG. 10. The arms 62 are provided with opposed slots 64 for supporting a pivoting pointer element 66. The pointer element 66 has a pair of opposed slots 68 which are received in the slots 64 of the support member 60 to allow the pointer member 66 to swing about an axis defined by the respective slots 64 and 68.

The pointer element has a pointer 70 extending outwardly on one side of the pivot axis and has a center leg 72 and two outer legs 74 extending outwardly on the opposite side of the pivot axis. As shown in FIG. 20, the center leg 72 enters the central gap in the coil 58 as the pointer element 66 swings about the pivot axis. The outer legs 74 move across the opposite sides of the coil as the pointer element pivots. The center leg is magnetized longitudinally, as shown by the arrow in FIG. 11, while the outer legs 74 are magnetized in the opposite direction, as shown by the arrows in FIG. 11.

When the leads from the coil 58 are connected across the terminals 54, and electrical current is applied to the coil, flux is induced along the axis of the coil through the central cap in one direction and along the exterior of the coil in a direction opposite to the direction of flux in the gap. The pointer 70 swings about the pivot axis through an arc corresponding to the magnitude of the flux induced in the coil.

A damper is provided to restrict vibration of the pointer 70. The damper includes a projection 76 on the pointer element 66 adjacent the lower pivot slot 68. A cup 78 mounted on the support member 60 is filled with viscous fluid and when the pointer element 66 is assembled with the support member 60, the projection 76 is submerged in the viscous fluid. Since the projection is offset from the pivot axis, movement of the projection through the fluid produces a damping effect.

A small permanent magnet 80 is mounted on the bottom of the case 48 to provide a restoring torque on the pointer element when current is not flowing in the coil 58.

Since portions of the pointer element 66 move not only through the center of the coil 58, but also across the outer surface of the coil, substantially the entire magnetic field is utilized for moving the pointer 70. Since the legs 72 and 74 are magnetized in opposite directions, the pointer element 66 is less sensitive to external fields.

A third embodiment of the meter movement of this invention is illustrated in FIGS. 13 to 16. The meter movement incudes a frame 82 which is formed from a single piece of electrically conductive material, such as copper. The frame 82 includes a pair of conductive leads 84 and 86 which may serve not only to conduct current, but also to mount the movement in a case, if desired. A bracket 88 projects outwardly from the frame 82 and a support member 90 is secured on the bracket 88 by a pair of rivets 91. The support member 90 has a pair of arms 92 projecting outwardly from the bracket 88. Aligned notches 94 are formed adjacent the outer end of each arm 92.

A pointer member 96 is pivotally mounted on the support member 90. The pointer member is preferably formed of a single sheet of material that is suitable for being magnetized. The pointer member 96 includes a pointer 98, a body 100 and a pair of vanes 102. The vanes 102 and the pointer 98 are preferably integral with the body 100. The vanes 102 are substantially parallel to each other and are magnetized in the direction shown by the arrow on the respective vanes. The body 100 has a central slot 104. The length of the slot 104 is substantially equal to the distance separating the bottom of the respective notches 94 in the support member 90, for forming a pivotal mounting as in the other embodiments.

The arms 92 of the support member 90 are inserted into the slot 104. The ends of the arms 92 may be temporarily flexed toward each other and released when the notches 94 are aligned with the slot 104. Thus, the notches engage the opposite ends of the slot, thereby supporting the pointer member 96 for swinging about the pivot axis P which is illustrated schematically in FIGS. 15 and 16. The notches 94 cooperate with the slot 104 to retain the members together and prevent relative displacement longitudinally of the slot 104 or longitudinally of the arms 92, or transversely of the arms 92. The right angle bend 106 in the support member 90 isolates the arms 92 from stresses due to the mounting of the support member on the bracket 88. The pointer may be coated with paint, and a compensating amount of paint is applied to the vanes so that the balance of the pointer member with respect to the pivot axis is undisturbed by the paint.

The driving coil is in the form of a one half turn conductor bar 108 which extends between the arms 84 and 86. As shown in FIGS. 13 and 16, the vanes 102 extend on opposite sides of the bar 108. The curved shape of the bar, as shown in FIG. 13, provides the desired torque characteristics with reasonable linearity.

The frame 82 also includes an arm 110 projecting inwardly from the arm 84. A cup 112 is formed in the arm 110 in substantial alignment with the pivot axis P. A paddle 114 on the lower end of the body 100 of the pointer member 96 projects into the cup 112. The cup is filled with a viscous fluid. By selecting a fluid having the appropriate viscosity, the desired degree of damping is achieved.

In order to return the pointer 98 to a predetermined location on the scale, a restoring magnet 116 is mounted on the frame 82 in alignment with the pivot axis P. The restoring magnet 116 is magnetized diametrically and by rotating the magnet, the zero position of the pointer can be adjusted. The magnet 116 is held in place by a suitable clamp 118.

The pointer member 96 and the support member 90 are preferably assembled with the frame 82 by connecting the support member to the bracket 88 and then inserting the arms 92 into the slot 104. These operations can be performed easily and do not require precise hand operations.

When the frame 82 is mounted in a case, it may be necessary to insulate portions of the frame from the case and this can easily be done by molding a plastic block around the lower portion of the frame. The arms 84 and 86 as shown in FIGS. 13 to 16 are merely illustrative of suitable electrical conductors and other conventional conductors may be substituted, if desired.

When a source of electrical current is connected across the arms 84 and 86, current flows through the bar 108, thereby forming a magnetic field around the bar. The magnetic flux due to the current urges the pointer to assume a position in which the magnetized vanes 102 are aligned with the field produced by the combined effects of the conductor bar 108 and the restoring magnet 116. As the pointer member 96 swings about the pivot axis P, the position of the vanes 102 relative to the bar 103 changes and by appropriate shaping of the bar 108, the movement of the pointer 98 is substantially proportional to the magnitude of the current flowing in the bar.

As a measure of the improved results achieved by the embodiment of FIGS. 13 to 16, a model was constructed in accordance with this embodiment. The measured torque for driving the pionter member 96 was about 70 milligram-millimeters, with a suspended weight of 33 milligrams. This compares with a conventional meter movement in which the dirving torque was found to be 210 milligrams-millimeters, with a suspended weight of 437 milligrams. Thus, the ratio of torque to weight of the embodiment of FIGS. 13 to 16 is considerably greater than that of conventional meter movements.

A fourth embodiment of the meter movement of this invention is illustrated in FIG. 17. Instead of the metal frame 82, which is used in the embodient of FIGS. 13 to 16, the embodiment of FIG. 17 includes a frame 120 molded of non-conductive plastic material. A pair of sockets 122 are formed in the frame 120. Threaded posts 124, which are electrically conductive and are preferably made of copper or brass, are mounted in the sockets 122. The posts 124 are suitable for mounting the frame 120 in a case and serve as electrical terminals for the meter movement.

A bracket 126 is provided on the frame 120. Preferably, the bracket 126 is molded integrally with the frame 120. A support member 128 is secured on the bracket 126 by screws, such as are shown in FIG. 13, or by other suitable means. A portion 130 of the frame 120 overlaps the support member 128. A pointer member 132 is mounted for pivoting movement on the support member 128 in the same manner as previously described with respect to the embodiment of FIGS. 13 to 16. The pointer member 132 includes vanes 134 which correspond to the vanes 102. The vanes 134 are are magnetized transversely in the same manner as the vanes 102 illustrated in FIG. 14.

A coil form which is indicated generally at 136 is integrally molded in the frame 120 and has a central slot 138 in which one of the vanes 134 is received. Slot 138 has sufficient length to allow the pointer member 132 to swing through a substantial arc without causing the vane 134 to engage either end of the slot 138. A coil 140 of fine wire is wound on the coil form 136 and the ends of the wire are soldered to the posts 124, as shown in FIG. 17.

A damper is provided to restrict vibration of the pointer member 132. The damper includes a cup portion 142 molded integrally with the frame 120. The cup 142 is filled with viscous fluid and a projection on the pointer member 132 is submerged in the viscous fluid to provide a damping effect.

When electric potential is applied across the terminal posts 124, current flowing in the coil 140 induces a magnetic field in the conventional pattern. The magnetic flux which intersects the vane 134 in the slot 138 flows in the direction that is opposite to the magnetic flux which intersects the outer vane 134. The pointer member 132 swings to a position aligned with the resultant of the magnetic forces acting on the pointer member 132.

While the invention has been illustrated and described in certain embodiments, it is recognized that other variations and changes may be made therein without departing from the invention as set forth in the claims.

What is claimed is:

1. A meter movement comprising: support means and a pointer member mounted on said support means for pivoting about a pivot axis, said pointer member having a pivot portion and an elongated pointer portion and a pair of vane portions, said pivot portion having an elongated slot aligned with said pivot axis, said support means including a support member projecting through said slot, said support member and said pivot portion having opposed surfaces cooperating to restrict said pointer member to swinging movement about said pivot axis, said vane portions projecting outwardly from said pivot portion on one side of said pivot axis and said pointer portion projecting outwardly from said pivot portion on the opposite side of said pivot axis, said vane portions being substantially flat and being substantially parallel to each other, at least one of said vane portions being magnetized in a direction perpendicular to the length of said pointer portion, and means for establishing an electromagnetic field adjacent said pointer member whereby the electromagnetic field adjacent said vane portions applies torque to turn said pointer member relative to said support member about said pivot axis.

2. The meter movement according to claim 1 wherein said pivot portion is substantially flat and extends between said vanes, said slot being positioned between said vanes.

3. The meter movement according to claim 1 wherein said establishing means incudes an electrically conductive bar extending between said pair of vanes and spaced from said pivot axis, whereby current flowing in said conductive bar induces a magnetic field which applies torque to said pointer member to swing said pointer member about said pivot axis.

4. The meter movement according to claim 3 wherein said support means includes a frame, said conductive bar being integral with said frame and said support member is mounted on said frame.

5. The meter movement according to claim 1 wherein said establishing means includes an electromagnetic coil having a central opening, one of said vane portions extending within said opening.

6. The meter movement according to claim 5 wherein said support means includes a frame having a coil form thereon, said coil being wound on said form.

7. A meter movement comprising:
a. base means;
b. electric current conductor means on said base means for inducing magnetic flux in an adjacent zone when energized; said conductor means being a coil having a gap along the central axis of the coil,
c. pointer means mounted on said base means for pivoting about a pivot axis, said pivot axis being substantially perpendicular to the central axis of said coil, said pointer means including a permanently magnetized portion and including pivot bearings integral with said magnetized portion, said magnetized portion of said pointer means being movable into said gap upon pivoting about said pivot axis, said pointer means including a center leg and a pair of outer legs spaced apart from each other along the pivot axis, said legs extending substantially parallel to each other and substantially perpendicular to said pivot axis, said magnetized portion being on said center leg and said outer legs each being magnetized in a direction opposite to the magnetization of the center leg, whereby said magnetized portion cooperates with said conductor means to swing said pointer means about said pivot axis in response to current flowing in said conductor means.

8. The meter movement according to claim 7 wherein said pointer means has a projection offset from said pivot axis, said base means including a cup for receiving a viscous fluid, said projection extending into said cup, whereby motion of said pointer means is dampened by movement of said projection through said viscous fluid.

9. A meter movement comprising:
a. an elongated thin substantially flat movable member, said movable member having a vane portion adjacent one end and a pointer portion adjacent the opposite end, and a pivot portion between said vane and pointer portions;
b. a support member, said support member being formed of a thin substantially flat, resiliently flexible material, said pivot portion of said movable member and said support member each having opposed slots mutually received in each other for pivoting movement about a pivot axis aligned with said slots, the plane of said vane portion being substantially perpendicular to the plane of said pivot portion and said vane being permanently magnetized in a direction perpendicular to the plane of said pivot portion;
c. electric coil means fixed adjacent said support member and said pivot axis, said coil means having a central opening and being coaxial with said opening, said vane portion being received in said opening, said pivot axis being positioned relative to said coil means so that swinging of said movable member about said pivot axis progressively changes the angle between the direction of magnetization in the vane portion and the central axis of said coil means.

10. The meter movement according to claim 9 wherein the plane of said pointer portion is substantially perpendicular to the plane of said pivot portion.

11. The meter movement according to claim 10 wherein said pointer portion is permanently magnetized in a direction perpendicular to the plane of said pivot portion but in a direction opposite to the direction of magnetization of said vane portion.

12. A meter movement comprising:
a. base means
b. an electric coil fixed on said base means and having a central gap therein,
c. a support member mounted on said base means, said support member including a pair of thin resiliently flexible arms, said arms being spaced apart and having opposing slots,
a pointer element formed of thin resiliently flexible sheet material, said pointer element having a body portion with opposed slots therein, said body portion slots being received in said support member slots for pivoting movement of said pointer member about an axis defined by said slots, said pointer element including a pointer extending outwardly from said body portion on one side of said axis and a vane extending outwardly from said body portion on the opposite side of said axis, said vane being magnetized and being movable into the central gap of said coil upon pivoting of said pointer element about said axis, said vane having a greater width than thickness, said width dimension extending perpendicular to said pivot axis, and
e. a second coil fixed on said base means and having a central gap therein, each of said coils having a central axis extending through said central gap and intersecting each other adjacent said pivot axis, said vane being movable into the central gap of each of said coils, whereby said pointer element swings in response to current flowing in said coil.

13. A meter movement comprising:
a. a coil form,
b. an electric coil wound on said form and having a central gap therein,
c. a support member mounted on said coil form, said support member including a pair of thin resiliently flexible arms, said arms being spaced apart and having opposing slots,
d. a pointer element formed of thin resiliently flexible sheet material, said pointer element having a body portion with opposed slots therein, said body portion slots being received in said support member slots for pivoting movement of said pointer member about an axis defined by said slots, said pointer element including a pointer extending outwardly from said body portion on one side of said axis and a vane extending outwardly from said body portion on the opposite side of said axis, said vane having a greater width than thickness and said width dimension extending perpendicular to said pivot axis, said vane being magnetized and being movable into the central gap of said coil upon pivoting of said pointer element about said axis, said pointer being magnetized in a direction opposite to the direction of magnetization of said vane, thereby balancing the effect due to external magnetic flux.

14. A meter movement comprising:
a. a coil form,
b. an electric coil wound on said form and having a central gap therein,
c. a support member mounted on said coil form, said support member including a pair of thin resiliently flexible arms, said arms being spaced apart and having opposing slots,
d. a pointer element formed of thin resiliently flexible sheet material, said pointer element having a body portion with opposed slots therein, said body portion slots being received in said support member slots for pivoting movement of said pointer member about an axis defined by said slots, said pointer element including a pointer extending outwardly from said body portion on one side of said axis and a vane extending outwardly from said body portion on the opposite side of said axis, said vane being magnetized and being movable into the central gap of said coil upon pivoting of said pointer element about said axis, said vane having a greater width than thickness, said width dimension extending parallel to said pivot axis, said pointer element including a pair of outer legs extending substantially parallel to said vane, said outer legs being magnetized in a direction opposite to the magnetization of said vane, said outer legs being integral with said body portion being movable across the exterior of said coil, whereby said pointer element swings in response to current flowing in said ccil.

15. The meter movement according to claim 14, wherein said vane, said outer legs, said body portion and said pointer are all substantially planar.

16. The meter movement according to claim 15, including a projection on said body portion, said projection being offset from said pivot axis, a receptacle for viscous fluid on said support member, said projection being received in said receptacle whereby viscous fluid in said receptacle cooperates with said projection to damp swinging movement of said pointer element about said axis.

17. The meter movement according to claim 9, including a second coil on said base means spaced from said first mentioned coil, said vane being movable into the central opening of said second coil upon swinging about said pivot axis.

* * * * *